June 13, 1944.   M. D. McCARTY   2,351,353
GALVANOMETER
Filed Dec. 19, 1941   3 Sheets-Sheet 1
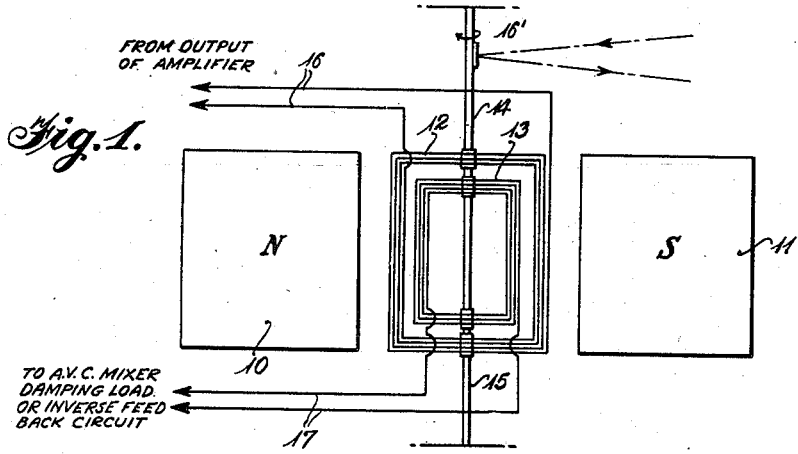
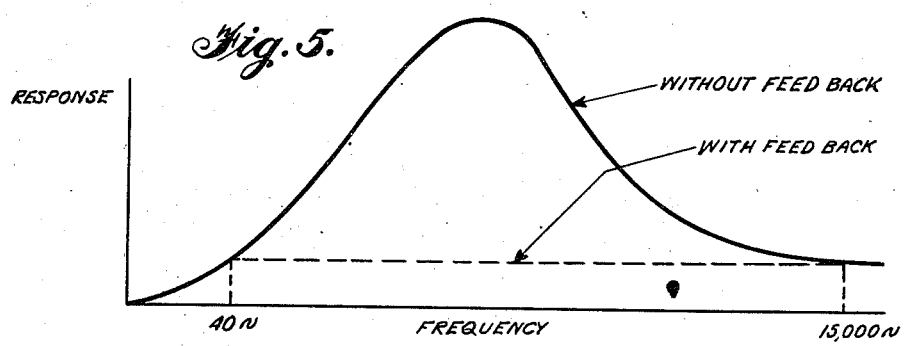
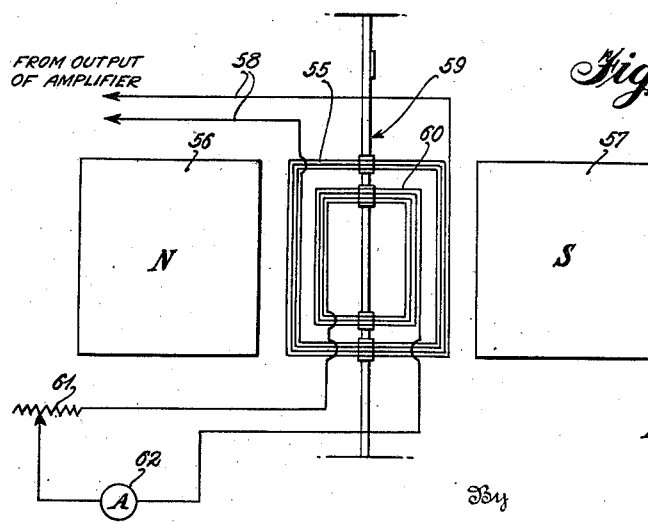
Inventor
Malcolm D. McCarty

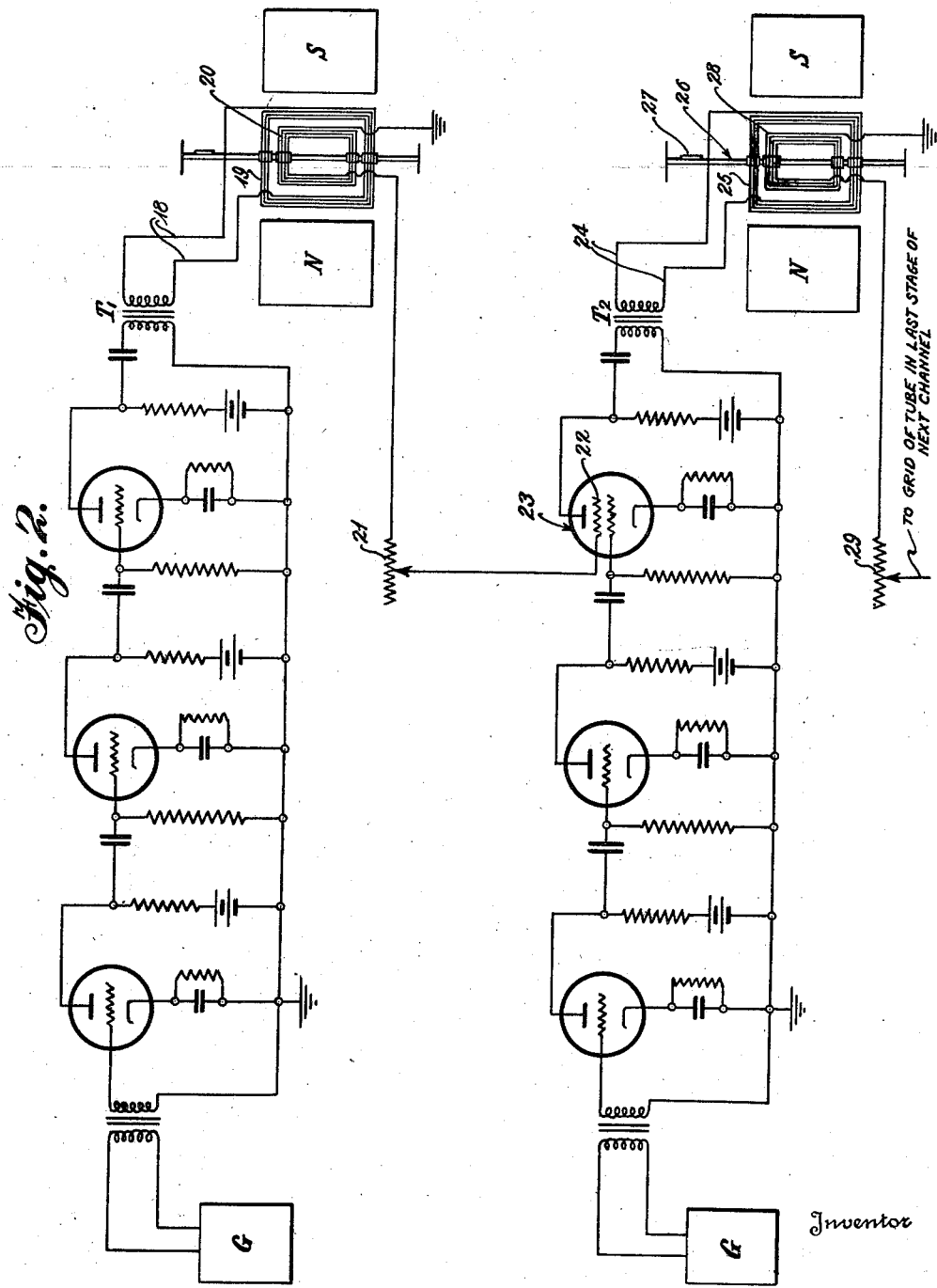

June 13, 1944.  M. D. McCARTY  2,351,353
GALVANOMETER
Filed Dec. 19, 1941  3 Sheets-Sheet 3
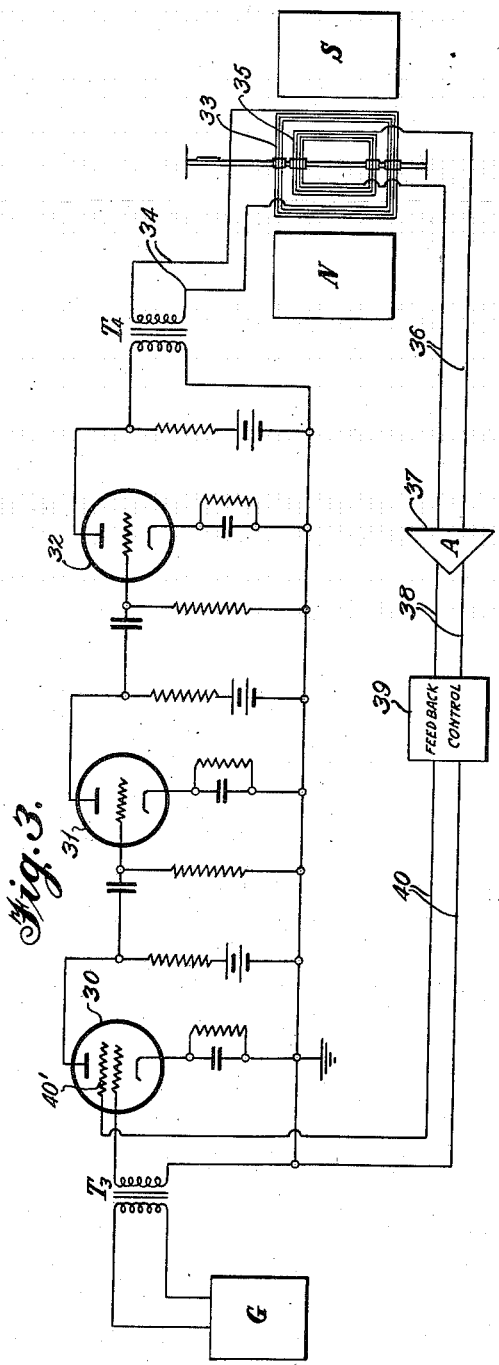
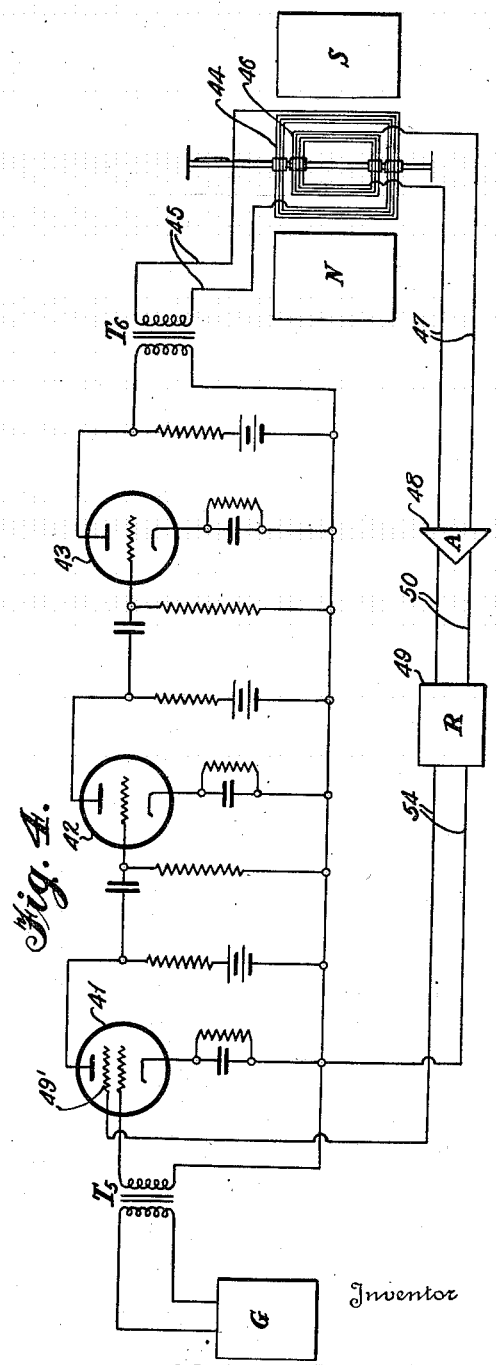
Inventor
Malcolm D. McCarty
By
Myron J. Burkhart
Attorney Patented June 13, 1944

2,351,353

UNITED STATES PATENT OFFICE 2,351,353

GALVANOMETER

Malcolm D. McCarty, Dallas, Tex., assignor to Socony-Vacuum Oil Company, Incorporated, New York, N. Y., a corporation of New York Application December 19, 1941, Serial No. 423,617

9 Claims. (Cl. 171—95)

This invention relates to an oscillograph of the single or multiple element type and more particularly to the reflection type of galvanometer which forms one element of an oscillograph and which functions as an element responsive to the passage or flow of electric currents therethrough.

In particular, the invention relates to the rotating or oscillating element suspended in a uniform magnetic field and further to the novel manner in which particular uses may be made of this oscillating element.

These particular uses or applications have been found to apply most readily to the science of geophysical prospecting as practiced by the seismograph method for locating geological structures favorable to the accumulation of petroleum products. Uses of the invention, other than those disclosed herewith, may be seen readily by those skilled in the scientific arts and it is not the intention to describe all the uses to which the invention may be put.

In the seismograph method for petroleum geophysical prospecting, it is customary to use electric circuits, vacuum tube devices, geophones or vibration detectors or various types along with other electromagnetic types of equipment. In operation, as practiced in prospecting work, all of these devices and equipment possess various types of distortion. The photographic records obtained to represent the original earth vibrations at geophones are seldom true records or represent accurate reproductions of the earth vibrations at the geophones. The instant invention provides a simple method to correct for amplitude distortion of the complete seismograph system.

Another feature provided simply by the instant invention is a desirable form of volume or amplitude control of the photographic traces during the time interval corresponding to the taking or "shooting" of the record. This control in the instant invention distinguishes itself from other types in that the control voltage is a funcion of the amplitude of the photographic record of the individual traces. Thus, the control voltage takes into account the galvanometer characteristics in addition to those of all the other parts of the complete seismograph system.

Under certain conditions and in some geological areas the practice of mixing or multiple recording has been adopted. This has been accomplished heretofore in the input or output circuits of the various channels. If input mixing is practiced, the mixed signals are further modified by the amplifying and recording equipment before recording on the photographic paper. If output mixing is used, this is accomplished at the output terminals of the amplifiers. This is superior to the input mixing in that the output signals have had opportunity to be trimmed before mixing.

Mixing by the instant invention, however, takes into account, additionally, the characteristics of the suspended galvanometer coils where the mixing voltages are obtained in a novel manner to be described. This mixing voltage can be connected directly to adjacent channels of galvanometer coils and thus the mixing voltage is not distorted or modified by adjacent channel equipment.

Therefore, the primary object of this invention resides in the provision of a recording instrument by means of which mixing of signals from a plurality of stations and automatic volume control of the signals being amplified by the individual amplifiers can be effected by the recording galvanometer.

Another object of this invention resides in the provision of a recording galvanometer having a vibrating element that comprises two independent coils.

Another object of this invention resides in the provision of a multiple-element galvanometer in which each of the vibrating elements is provided with two independent coils by means of which mixing or automatic volume control can be effected.

Still another object of this invention resides in the provision of a multiple-element galvanometer in which each vibrating element is provided with a motor generator set, the motor rotor of which is the coil which records directly signals passing through the channel connected to that coil, the generator rotor being the independent coil that is driven by the motor.

Another object of this invention is the provision of means for accomplishing automatic volume control by signals that are actually being recorded rather than those that exist in a particular stage of the amplifier.

This invention further contemplates a method and apparatus for mixing signals from adjacent stations without introducing electrical connection between adjacent seismograph channels which comprise respectively, geophones, amplifiers and recording vibrating elements and their associated accessories.

This invention further provides a novel form of inverse feed-back by filtering and feeding back into an input of an amplifier a signal that has been generated by the signal being recorded, but 180° out of phase.

Another object of this invention resides in the provision of variable damping for the vibrating elements of a multiple-element recording galvanometer in that a variable load can be placed on the second coil provided on each vibrating element.

Another object of this invention resides in the provision of means whereby the signal being recorded can be introduced into the grid circuit of the last stage of adjacent channels for purpose of mixing.

Another object of this invention resides in the provision of means whereby amplitude distortion may be corrected directly by the signals actuating the recording galvanometer.

Other objects and advantages will become apparent from the following detailed description when considered with the accompanying drawings in which:

Figure 1 is a diagrammatic illustration of one of the vibrating elements of a multiple-element recording galvanometer in which the rotor comprises two independent coils and the stator is composed of permanent magnets.

Figure 2 shows two channels of a complete electric seismograph in which the principle of the instant invention is used for purpose of mixing;

Figure 3 shows a single channel of an electric seismograph in which the instant invention is used as an inverse feed-back response control.

Figure 4 is a circuit diagram showing the manner in which the instant invention can be used as an automatic volume control;

Figure 5 is a curve that has been plotted with response as ordinates and frequency as abscissae showing the effect of inverse feed-back; and Figure 6 is an enlarged diagrammatic illustration of a single vibrating element made in accordance with the instant invention showing the independent coils, one of which is to be used in the conventional manner for recording seismic data and the other of which is to be used for damping purposes.

Referring to the drawings in detail, particularly Figure 1, there is shown diagrammatically a single element of a multiple-element recording galvanometer. Magnetic poles 10 and 11 furnish a constant direct flux field in which are disposed two independent coils 12 and 13. Coils 12 and 13 are mounted on suspension ribbons 14 and 15 which form a common axis for the two coils. Coil 12, by means of conductors 16, operates in the same manner as the coil forming the vibrating element of a conventional multiple-element recording galvanometer, and is connected to the output of an amplifier. The oscillating signals impressed on the coil 12 by the amplifier produce about the coil a corresponding oscillating electrical field which will react with the constant magnetic field supplied by the magnetic poles 10 and 11 to develop corresponding mechanical oscillations of the coil. These mechanical oscillations can in the conventional manner be recorded on a moving, sensitized paper or photographic film by placing a mirror 16' on either the suspension ribbon or the coil and causing light to be reflected by the mirror from a source, not shown, onto the photographic film or sensitized paper. With coil 13 mechanically connected to coil 12 and adapted to be driven mechanically by coil 12 in the constant magnetic field supplied by the magnetic poles 10 and 11, there will be generated in the windings of coil 13 oscillating currents corresponding to those flowing in the coil 12. The oscillating currents generated in the windings of coil 13 can be conducted to an automatic volume control, inverse feed-back control, to mixing circuits or to a variable load to effect damping of the vibrating element by means of conductors 17.

In Figure 2 there is illustrated a method of mixing adjacent channels of an electric seismograph by means of the dual coil galvanometer elements. Two resistance-coupled amplifiers of conventional design are shown having geophones G connected to the input of each channel. The output of the top channel from transformer $T_1$ is fed by means of the conductors 18 into the motor-rotor coil 19 of the vibrating element.

The generator-rotor coil 20, being mechanically driven by coil 19, will generate signals that correspond to those impressed on the coil 19. The signals from the generator-rotor coil can be fed through a variable resistance 21 to the grid 22 of the vacuum tube 23 in the last stage of the bottom amplifier to mix the signals being recorded from the top amplifier with those being recorded from the bottom amplifier. The output from amplifier tube 23 is reproduced through the transformer $T_2$ in the circuit formed by the conductors 24 and is impressed across the motor-rotor coil 25 of the dual vibrating element 26. The composite signal is then recorded on a moving sensitized paper or photographic film in coordination with time by reflecting light from a source, not shown, by the mirror 27 onto the sensitized paper or photographic film. In the manner described in connection with the top channel, the currents generated by the generator-rotor coil 28 are fed through the variable resistance 29 to the grid circuit of the last amplifying stage of the next adjacent channel. With this arrangement, it is possible to produce mixing as well as a record that will be a composite of all of the signals generated by all channels.

In the usual amplifier systems certain noise and distortion components are introduced causing the character of the output signal to differ from that of the input signal. The advent of inverse feed-back in amplifiers has made it possible to use a stabilized feed-back that feeds a part of the output signal into the input circuit in such phase relation as to greatly diminish or eliminate these effects without danger of introducing instability or self-oscillation.

A feed-back circuit utilizing the instant invention is shown in Figure 3. In this use of the instant invention, signals generated by the geophone G are fed through the transformer $T_3$ into the input of a conventional resistance-coupled amplifier comprising the vacuum tubes 30, 31 and 32. The output from this amplifier is reproduced in the secondary of transformer $T_4$ and is impressed across the motor-rotor coil 33 by means of the conductors 34. The resultant oscillations of the coil 33 will drive the generator-rotor coil 35 proportionally to generate like signals in this coil. The signals generated in coil 35 are fed, by means of the conductors 36, into amplifier 37 where they are amplified. The output of amplifier 37 is fed by means of conductors 38 to a feed-back control 39. The output of the feed-back control 39 is impressed on the grid 40' of tube 30 by means of conductors 40, usually 180° out of phase with the input signal from the geophone G.

Using the second coil 35 of the vibrating element to generate feed-back current, the response-frequency characteristics of the entire channel, as illustrated in Figure 5, can be controlled within acceptable limits. With prior forms of inverse feed-back proper control of the response-frequency characteristics has been difficult because the constants of certain of the elements in the channel tend to change with time. In the present feed-back system the response-frequency characteristic is controlled by the transmission characteristic of the electrical feed-back circuit only. The solid line curve in Figure 5 which has been plotted with response as ordinates and frequency as abscissae, for a range of from zero to 15,000 cycles, illustrates the response with change of frequency when inverse feed-back is not used. The curve in dotted lines plotted to the same coordinates for a range of from 40 cycles to 15,000 cycles shows the response of the channel when inverse feed-back according to the instant invention is used. It will be seen that in comparison to the curve in solid lines, the dotted line curve illustrating the use of feed-back gives the entire channel a flat response characteristic for a wide range of frequencies.

The application of the instant invention to automatic volume control is illustrated by Figure 4 in which signals generated by the geophone G are fed through the transformer T5 to the control grid circuit of amplifier tube 41. Amplifier tube 41 forms a part of the first stage of a conventional resistance-coupled amplifier comprising additional amplifying tubes 42 and 43. The output from the last stage is reproduced in the secondary of transformer T6 and impressed across the motor-rotor coil 44 by means of the conductors 45. Coil 46, the generator-rotor coil, which is driven by the motor-rotor coil 44, will generate signals that correspond to those impressed across the coil 44. These signals are conducted by means of conductors 47 to an amplifier 48 where they are amplified. The output of amplifier 48 is conducted to a rectifier 49 by means of conductors 50. The rectified signals from the rectifier 49 are impressed on the grid 49' of the first tube 41 of the amplifier by conductors 54 and serves as a varying potential on the grid of tube 41 to control the gain characteristics of that tube.

Another use of the present invention is illustrated in Figure 6, where there is shown an enlarged diagrammatic view of a single vibrating element of a multiple-element recording galvanometer. In this form of the invention coil 55, disposed in the magnetic field between the north pole 56 and the south pole 57, is supplied by current from an amplifier, not shown, by means of conductors 58. The reaction of the magnetic field set up about the coil 55 with the constant flux furnished by poles 56 and 57 will produce forced oscillations of the vibrating element 59 comprising the two coils 55 and 60. Coil 60 is electrically independent of coil 55 and serves as a generator-rotor to generate a current corresponding to that impressed across the coil 55, when mechanically driven by coil 55. By placing a variable load represented by the variable resistance 61 in series with the ammeter 62 across the terminals of the coil 60, any degree of damping of the vibrating element 59 can be obtained dependent upon the value of the resistance 61 left in the circuit.

Although some of the advantages and uses of the instant invention have been described above in connection with electric seismograph apparatus, it is to be understood that the invention is not to be limited to these specific uses and limited only by the scope of the appended claims.

I claim:

1. A galvanometer comprising in combination a plurality of vibrating elements, means for providing a constant magnetic flux field for each element, each of said vibrating elements comprising at least two independent coils mechanically connected for simultaneous rotation, means for suspending said coils on a common axis so as to move mechanically together in said magnetic field, means for connecting one coil of each element to a signal source circuit, and means for connecting the other coil of each element to an independent circuit, whereby the signal from the signal source circuit flowing in the one coil reacts with the magnetic field so as to move both coils and power for the independent circuit is generated by the other coil.

2. A galvanometer comprising in combination a plurality of vibrating elements, means for providing a constant magnetic flux field for each element, each of said vibrating elements comprising at least two independent coils mechanically connected for simultaneous rotation, means for suspending said coils on a common axis so as to move mechanically together in said magnetic field, means for connecting one coil of each element to a signal source circuit, means for connecting the other coil of each element to an independent circuit such that a signal from the signal source circuit flowing in the one coil reacts with the magnetic field so as to move both coils and power for the independent circuit is generated by the other coil, and means for loading the independent circuit, whereby the application of load to the independent circuit will effectively damp the vibrating element.

3. A galvanometer comprising in combination a plurality of vibrating elements, means for providing a constant magnetic flux field for each element, each of said vibrating elements comprising at least two independent coils, a driving coil and a driven coil mechanically connected for simultaneous rotation, means for suspending said coils on a common axis so as to move mechanically together in said magnetic field such that a signal from the signal source circuit flowing in the one coil reacts with the magnetic field so as to move both coils and power for the independent circuit is generated by the other coil, means for connecting the driving coil of each element to the output circuit of an amplifier, means for connecting the driven coil of each element to an independent circuit, and means for connecting the independent circuit to the input of the same amplifier, whereby signals generated by the driven coil will be fed back to the input of the amplifier 180° out of phase with the input signal to effect a cancellation of undesirable signals.

4. A multiple-element galvanometer comprising in combination a plurality of vibrating elements, means for providing a constant magnetic flux field for each element, means for damping each element, and means operable by the vibration of said vibrating elements for initiating the damping of each element.

5. In an apparatus having a detector attached to generate electrical signals, an amplifier, a multiple-element galvanometer of the vibrating element type, an automatic volume control, said automatic volume control comprising means operable by a vibrating element of the galvanometer for generating signals corresponding to those being impressed on the vibrating element, means for rectifying the generated signals, and means for applying the rectified potential from the rectifier to the grid circuit of at least one stage in the amplifier to control the gain in amplification derivable therefrom.

6. An apparatus comprising in combination a detector, an amplifier, a galvanometer, said galvanometer having a plurality of vibrating elements, means for providing a constant magnetic flux field for each element, each of said vibrating elements comprising at least two independent coils, a driving coil and a driven coil mechanically connected for simultaneous rotation, means for suspending said coils on a common axis so as to move mechanically together in said magnetic field, means for connecting the driving coil of each element to the output circuit of said amplifier, means for connecting the driven coil of each element to an independent circuit such that a signal from the signal source circuit flowing in the one coil reacts with the magnetic field so as to move both coils and power for the independent circuit is generated by the other coil, a rectifier in each independent circuit, and means for connecting the rectifier to the grid circuit in at least one stage of the same amplifier, whereby the signals generated in the driven coil upon vibration of the vibrating element, after rectification, will control the gain in amplification derivable therefrom.

7. A galvanometer comprising in combination, a vibrating element, means for providing a constant magnetic flux field for said element, said element having at least two electrically independent coils mechanically connected on a common axis, means for suspending said coils for oscillation in said magnetic field, means for connecting one coil of the element to the circuit of a signal source, means for connecting another coil of the element to an independent circuit, whereby oscillations of the first coil will drive the second coil to generate a proportional signal in the independent circuit.

8. In an electrical system having one channel which comprises a detector, an amplifier and a vibrating element of a galvanometer, and at least one other channel which comprises a detector, an amplifier, mixing means and a vibrating element of a galvanometer, means operable by the vibration of the vibrating element of the first channel for generating signals corresponding to those actuating said vibrating element, means for conducting the signals so generated to the mixing means of said other channel, whereby the signals from the other channel would be a composite of the signals passing through at least two channels.

9. In an electrical system having one channel which comprises a detector, a thermionic tube amplifier, and a vibrating element of a galvanometer, and at least one other channel which comprises a detector, a thermionic tube amplifier one tube of which has an auxiliary grid element, and a vibrating element of a galvanometer, means for mixing the signals between the two channels, said means comprising means operable by the vibrating element of the first channel for generating signals corresponding to those actuating said vibrating element, the auxiliary grid of the thermionic tube in the other channel, and means for conducting the generated signals to the auxiliary grid, whereby the output signals from the other channel would be a composite of the signals passing through at least two channels.

MALCOLM D. McCARTY.